(12) United States Patent
Lee

(10) Patent No.: US 8,555,668 B2
(45) Date of Patent: Oct. 15, 2013

(54) CONDENSATE WATER GUIDE UNIT OF AIR CONDITIONER FOR VEHICLES

(75) Inventor: Byeong Jun Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 1129 days.

(21) Appl. No.: 12/324,435

(22) Filed: Nov. 26, 2008

(65) Prior Publication Data

US 2009/0151384 A1   Jun. 18, 2009

(30) Foreign Application Priority Data

Dec. 12, 2007 (KR) .................. 10-2007-0129248

(51) Int. Cl.
  *F25D 21/14*  (2006.01)
(52) U.S. Cl.
  USPC .................. 62/288; 62/285; 62/291
(58) Field of Classification Search
  USPC ............ 62/285, 288, 291; 24/457; 165/913
  See application file for complete search history.

(56) References Cited

U.S. PATENT DOCUMENTS

| | | | | |
|---|---|---|---|---|
| 3,199,307 | A | * | 8/1965 | Willis .............................. 62/241 |
| 4,350,025 | A | * | 9/1982 | Izumi ............................... 62/285 |
| 5,207,074 | A | * | 5/1993 | Cox et al. ......................... 62/285 |
| 5,392,613 | A | * | 2/1995 | Bolton et al. .................... 62/262 |
| 5,966,959 | A | * | 10/1999 | Stewart ............................ 62/285 |
| 6,044,656 | A | | 4/2000 | Shirota et al. |
| 6,062,032 | A | * | 5/2000 | Yoon ............................... 62/285 |
| 6,212,742 | B1 | * | 4/2001 | Baskin ............................ 24/457 |
| 6,289,688 | B1 | * | 9/2001 | da Luz Moraes et al. ...... 62/285 |

* cited by examiner

*Primary Examiner* — Judy Swann
*Assistant Examiner* — Filip Zec
(74) *Attorney, Agent, or Firm* — Morgan, Lewis & Bockius LLP

(57) ABSTRACT

A condensate water guide unit of an air conditioner for vehicles which collects and drains condensate water, generated on the evaporator, outside the air conditioner is disclosed. The condensate water guide unit includes a plurality of guide pieces for draining condensate water outside the air conditioner, and a support bar, which connects the guide pieces to each other. The guide pieces are in close contact with the lower end of an evaporator. Each guide piece has a guide slot for drawing condensate water formed on the surface of the evaporator, and a water moving passage for draining the drawn condensate water outside the air conditioner.

7 Claims, 5 Drawing Sheets

CONDENSATE WATER GUIDE UNIT OF AIR CONDITIONER FOR VEHICLES

CROSS-REFERENCE TO RELATED APPLICATIONS

This application claims priority to Korean Application No. 10-2007-0129248, filed on Dec. 12, 2007, the disclosure of which is incorporated herein by reference.

BACKGROUND OF THE INVENTION (1) Field of the Invention

The present invention relates to a condensate water guide unit, and more particularly a condensate water guide unit of an air conditioner for vehicles which drains condensate water, generated on the surface of an evaporator, outside the air conditioner.

(2) Description of the Related Art

As is well known to those skilled in the art, air conditioners are provided in vehicles to maintain passenger compartments at appropriate temperatures, thus providing pleasant surroundings to passengers. Such an air conditioner for vehicles includes a conditioner casing defining an air passage therein, a blower blowing air, an evaporator cooling drawn air, and a heater core heating air.

In the air conditioner, condensate water is generated on the surface of the evaporator by cooling peripheral moisture thereof. The condensate water falls below the evaporator. Here, some of the condensate water is drained outside the air conditioner through a drain hose, which is connected to the conditioner casing, but the rest of the condensate water remains in the conditioner casing.

As such, in the case where the condensate water, which remains in the conditioner casing, is not drained outside the air conditioner, the condensate water is dispersed by the heater core, so that offensive odors occur, or it may bring conditions in which germs such as mold can propagate, thus affecting the health of passengers.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, embodiments of the present invention provide a condensate water guide unit of an air conditioner for vehicles which can smoothly drain condensate water of an evaporator outside the air conditioner.

In order to accomplish the above object, an exemplary embodiment of the present invention may provide a condensate water guide unit of an air conditioner for vehicles, comprising, at least a guide piece in close contact with a lower end of an evaporator, each of the at least a guide piece having a mounting bracket including a guide slot for drawing condensate water formed on a surface of the evaporator, thereinto, and a mounting member including a water moving passage for draining the drawn condensate water outside the air conditioner; and a support bar for connecting the at least a guide piece via the mounting member thereof.

The condensate water guide unit may further comprise: a guide plate provided below the at least a guide piece to collect the condensate water drained through the water moving passage of the mounting member. The guide plate may be coupled to a drain hose to drain the collected condensate water outside.

The mounting member may further comprise at least two guide ribs protruding from each of the at least a guide piece to define the water moving passage between the guide ribs, the guide ribs being in close contact with the evaporator.

The mounting bracket may further comprise two jaws and form the guide slot therebetween. The mounting bracket may further comprise a coupling protrusion provided on at least one of the at least a guide piece and sufficiently long enough to be reliably fitted over a corresponding radiating tube. The coupling protrusion may include two prongs extending outwards therefrom.

The guide slot of the mounting bracket may have an inclined inner surface for collecting the condensate water and fluidly communicating with the water moving passage of the mounting member.

The mounting member may further include a receiving hole through which the support bar is inserted.

BRIEF DESCRIPTION OF THE DRAWINGS

The above and other features of the present invention will now be described in detail with reference to certain exemplary embodiments thereof illustrated with the accompanying drawings which are given hereinbelow by way of illustration, and thus are not limitative of the present invention, and wherein.

Figure 1:
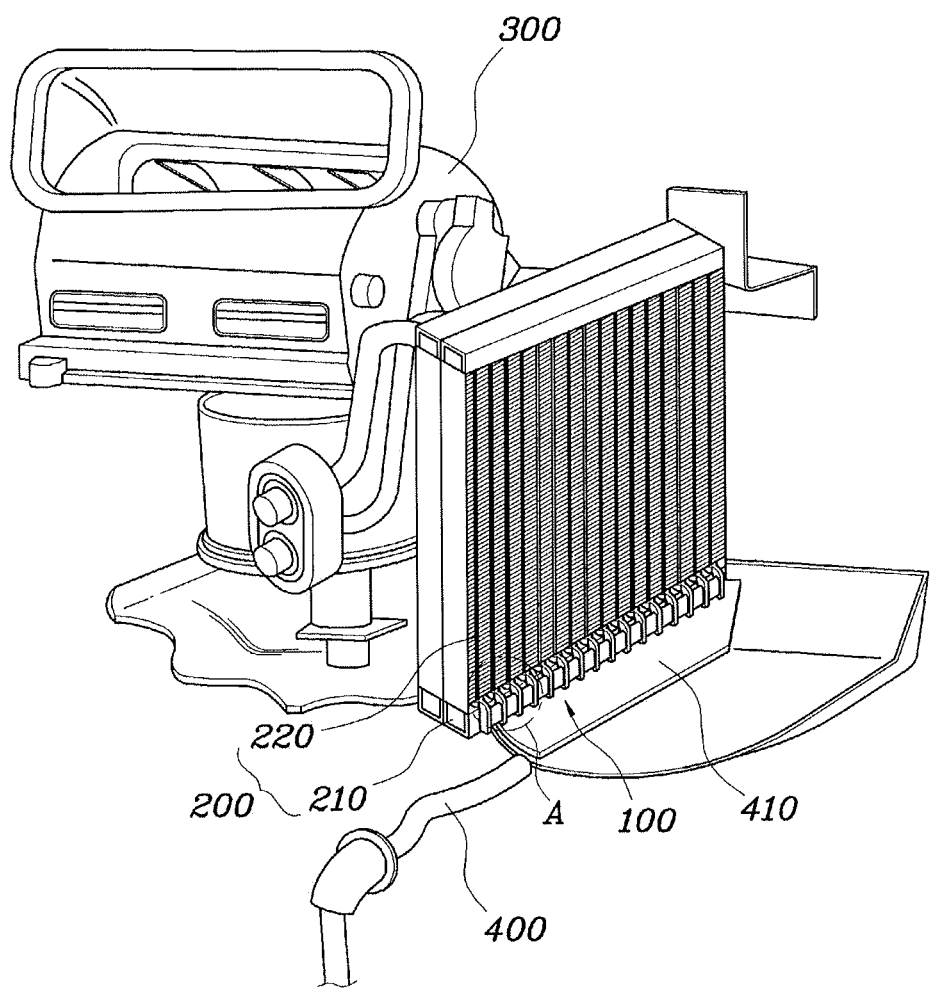
FIG. 1 illustrates an air conditioner for vehicles, according to the present invention.

In the figures, reference numbers refer to the same or equivalent parts of the present invention throughout the several figures of the drawing.

DESCRIPTION OF THE PREFERRED EMBODIMENTS

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 2:
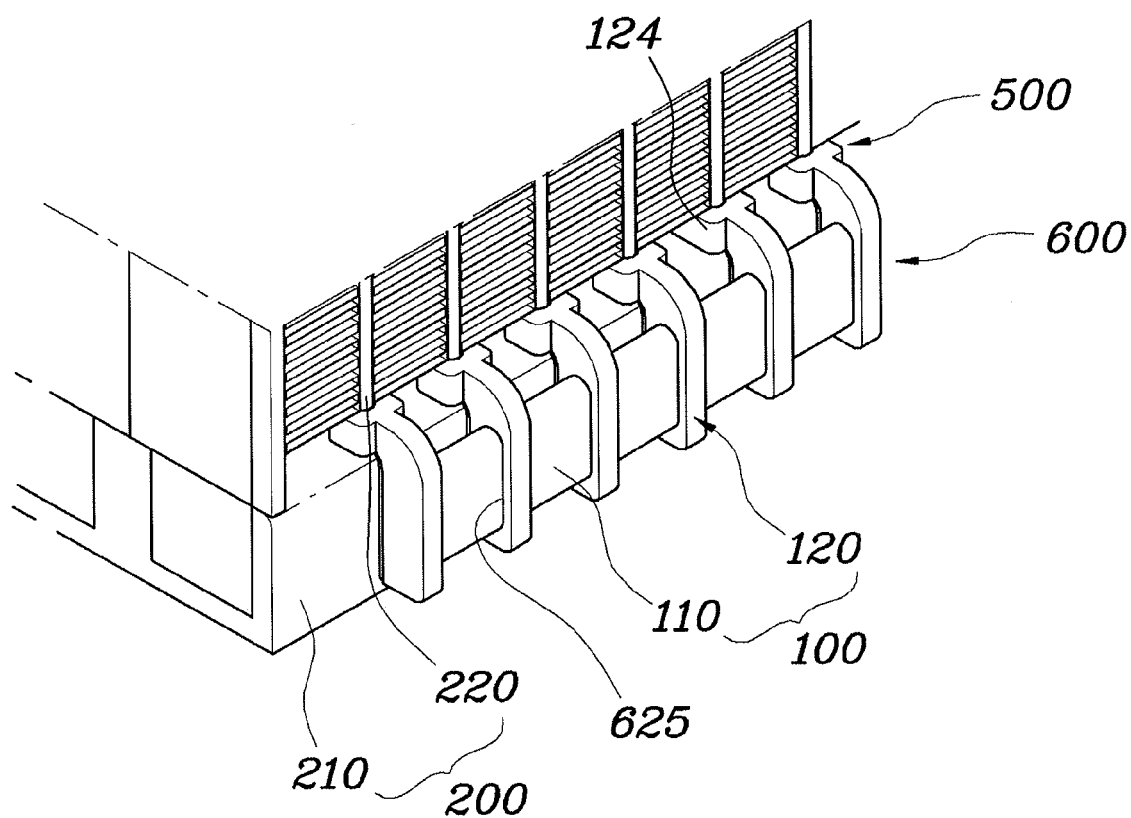
FIG. 2 is enlarged views of a circled portion "A" of FIG. 1.
Figure 3:
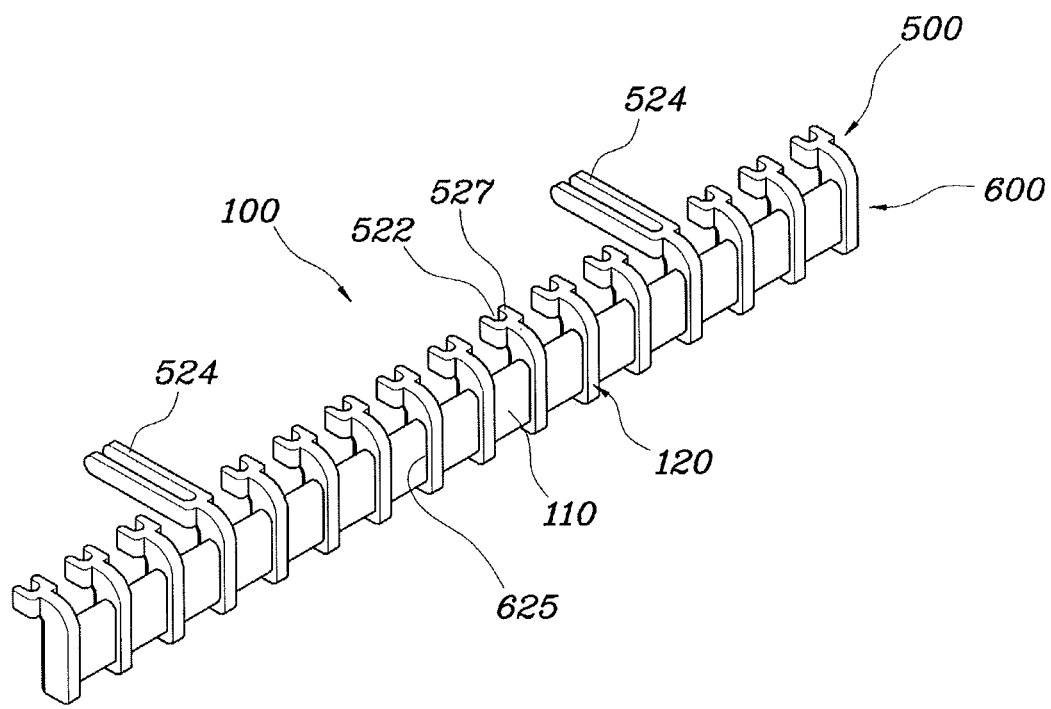
FIG. 3 is a perspective view of a condensate water guide unit of the air conditioner for vehicles, according to the present invention.

As shown in FIGS. 1 through 3, a condensate water guide unit for an air conditioner of a vehicle according to the embodiment of the present invention includes a support bar 110, which extends in the transverse direction of a header tank 210, and a plurality of guide pieces 120, which are arranged along the longitudinal direction of the support bar 110 at positions spaced apart from each other at regular intervals to guide condensate water into a drain hose 400. In the present invention, condensate water, occurring on the surface of an evaporator 200, falls below the header tank 210 of the evaporator 200, and is smoothly drained outside the air conditioner through the guide pieces 120 as explained later.

A guide plate 410 may be provided below the guide pieces 120. The guide plate 410 serves to collect condensate water, which is moved downwards through the guide pieces 120, and guide the condensate water to the drain hose 400.

In detail, the air conditioner of the vehicle includes a conditioner casing 300, a blower, the evaporator 200 and a heater core. The evaporator 200 includes a plurality of radiating tubes 220, through which refrigerant flows, and a plurality of radiating fins for promoting the radiation of heat. The header tank 210 is coupled to ends of the radiating tubes 220. The condensate water guide unit 100 is provided under the radiating tubes 220 to collect and drain condensate water, which is generated in the evaporator 200, outside the air conditioner.

Figure 4:
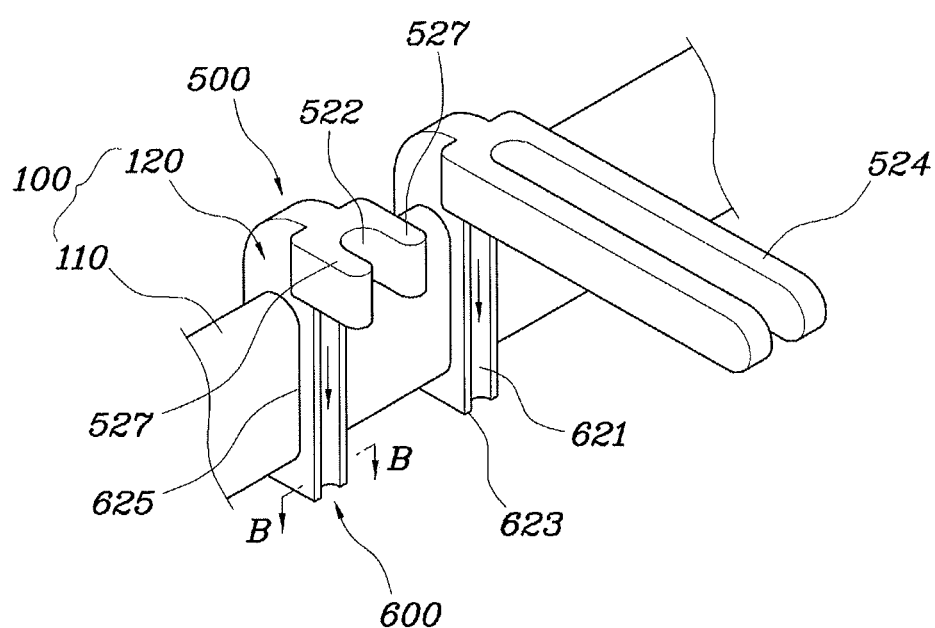
FIG. 4 is a partially enlarged view of the guide unit of FIG. 3.
Figure 5:
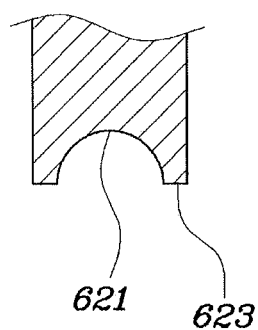
FIG. 5 is a sectional view taken along the line B-B of FIG. 4.

As shown in FIGS. 3-5, the condensate water guide unit 100 includes the support bar 110 and a plurality of the guide pieces 120. The support bar 110 according to the exemplary embodiment of the present invention extends with a predetermined length in the transverse direction of the header tank 210 and connects the guide pieces 120 to each other through the receiving hole 625 of the guide pieces 120.

The guide piece 120 comprises a mounting bracket 500 comprising at least two jaws 527 and a guide slot 522 therebetween, and a mounting member 600 including a receiving hole 625 and at least two guide libs 623 forming a water moving passage 621 therebetween.

Accordingly, the guide pieces 120 are provided on the support bar 110 through the receiving hole 625 of the mounting member 600 and arranged at positions spaced apart from each other at regular intervals in the longitudinal direction of the support bar 110. In an exemplary embodiment of the present invention, the support bar 110 is configured to be inserted through the receiving hole 625 of the mounting member 600.

The guide pieces 120 guide condensate water, which occurs on the surface of the evaporator 200, outside the air conditioner, thus preventing condensate water from remaining in the conditioner casing.

To achieve the above-mentioned purpose, the guide slot 522 disposed between the jaws 527 of the mounting bracket 500 is formed in the upper end of each guide piece 120. The guide slot 522 is configured to be in contact with a distal end portion of the corresponding radiating tube 220 such that condensate water occurring on the surface of an evaporator 200 is drawn into the guide piece 120 through the guide slot 522 of the mounting bracket 500.

A water moving passage 621 of the mounting member 600 is formed under the guide slot 522 of the mounting bracket 500 along the transverse direction of the support bar 110. Preferably, the guide slot 522 of the mounting bracket 500 has an inclined inner surface, which is formed at an incline towards the water moving passage 621 of the mounting member 600. Thus, condensate water, which falls downwards along the radiating tubes 220, can be easily drawn into the water moving passage 621 of the mounting bracket 500.

The water moving passages 621 of the mounting member 600 for guiding condensate water, which is drawn into the condensate water guide unit 100 through the guide slots 522 of the mounting bracket 500, outside the air conditioner are formed in the respective guide pieces 120. Each water moving passage 621 of the mounting member 600 has a depression shape, which is defined by guide ribs 623. The guide ribs 623 of the mounting member 600 protrude outwards from the corresponding guide piece 120 to define the water moving passage 621 therebetween, and are in close contact with the evaporator 200.

The operation of the present invention as an exemplary embodiment, having the above-mentioned construction, will be explained herein below.

Water condenses on the surface of the evaporator 200 due to the low temperature of the evaporator 200. The condensate water moves downwards along the radiating tubes 220 of the evaporator 200. The condensate water, which has been moved to the lower ends of the radiating tubes 220, is collected into the guide pieces 120.

That is, condensate water forms relatively large beads of water while moving into the water moving passages 621 of the mounting member 600 through the guide slots 522 of the mounting bracket 500. Therefore, the condensate water can be rapidly exhausted outside the evaporator 200, and the amount of condensate water that remains in the evaporator 200 is markedly reduced. Condensate water, which has been moved below the evaporator 200 through the guide pieces 120, is moved over the guide plate 410 into the drain hose 400, which is disposed adjacent to the header tank 210, and is thus drained outside the air conditioner.

Meanwhile, in another exemplary embodiment of the present invention, to fasten the condensate water guide unit 100 to the evaporator 200, the mounting bracket 500 may comprise coupling protrusions 524, which are fitted over the corresponding radiating tube 220, wherein the coupling protrusions 524 are provided on the mounting bracket 500 of at least one guide piece 120 selected among the guide pieces 120. The coupling protrusions 524 of the mounting bracket 500 have two prongs such that the coupling protrusions 524 are reliably fitted over the corresponding radiating tube 220.

When the condensate water guide unit 100 is mounted to the evaporator 200, the coupling protrusions 524 of the mounting bracket 500 are fitted over and locked to the corresponding radiating tube 220 of the evaporator 200. Therefore, the condensate water guide unit 100 can be firmly fastened to the evaporator 200, and the guide ribs 623 of the mounting member 600 can be brought into close contact with the header tank 210.

As described above, in the condensate water guide unit of an air conditioner for vehicles according to the present invention, condensate water, which is generated on the surface of an evaporator, is guided outside the air conditioner, thus preventing the propagation of germs and the generation of offensive odors attributable to remaining condensate water. Therefore, the present invention is advantageous in that a pleasant passenger compartment can be realized in a vehicle.

Furthermore, in the present invention, because condensate water that is generated on the evaporator can be smoothly exhausted outside the air conditioner, elements of the air conditioner are prevented from corroding due to condensate water. Therefore, there is an advantage in that the quality of the product is enhanced.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A condensate water guide unit of an air conditioner for vehicles, comprising:
   at least a guide piece in close contact with a lower end of an evaporator, each of the at least a guide piece having:
      a mounting member including a water guide passage; and
      a mounting bracket protruding from an upper portion of the mounting member toward a radiating tube of the evaporator and including a guide slot for drawing condensate water formed on a surface of the evaporator, thereinto, wherein the guide slot of the mounting bracket has an inclined inner surface for collecting the condensate water and fluidly communicating with the water guide passage of the mounting member; and
a support bar for connecting the at least a guide piece via the mounting member thereof;
wherein the mounting bracket further comprises a gripper for gripping said radiating tube provided on at least one of the at least a guide piece, to be fitted over a corresponding radiating tube; and a guide for guiding said condensate water, wherein the gripper for gripping said radiating tube comprises a coupling protrusion which encloses the corresponding radiating tube and is directly locked thereto.

2. The condensate water guide unit as set forth in claim 1, further comprising:
a guide plate provided below the at least a guide piece to collect the condensate water drained through the water guide passage of the mounting member.

3. The condensate water guide unit as set forth in claim 2, wherein the guide plate is coupled to a drain hose to drain the collected condensate water outside.

4. The condensate water guide unit as set forth in claim 1, wherein the mounting member further comprises at least two guide ribs protruding from each of the at least a guide piece to define the water guide passage between the guide ribs, the guide ribs being in close contact with the evaporator.

5. The condensate water guide unit as set forth in claim 1, wherein guide for guiding said condensate water further comprises two jaws and form the guide slot therebetween.

6. The condensate water guide unit as set forth in claim 1, wherein the coupling protrusion includes two prongs extending outwards therefrom.

7. The condensate water guide unit as set forth in claim 1, wherein the mounting member further includes a receiving hole through which the support bar is inserted.

* * * * *